(12) United States Patent
Jung

(10) Patent No.: US 6,412,952 B1
(45) Date of Patent: Jul. 2, 2002

(54) CRT COUPLING APPARATUS OF PROJECTION TELEVISION

(75) Inventor: Sung-soo Jung, Kyungki-do (KR)

(73) Assignee: Samsung Electronics, Co., Ltd., Suwon (KR)

( * ) Notice: Subject to any disclaimer, the term of this patent is extended or adjusted under 35 U.S.C. 154(b) by 35 days.

(21) Appl. No.: 09/725,176

(22) Filed: Nov. 29, 2000

(30) Foreign Application Priority Data

Aug. 25, 2000 (KR) ......................................... 2000-49646

(51) Int. Cl.[7] ......................... G03B 21/14; H04N 5/645; H04N 5/72
(52) U.S. Cl. ......................... 353/74; 353/100; 348/825; 348/832; 313/478; 313/482
(58) Field of Search ................................ 348/826, 825, 348/832, 827; 353/74, 100, 101; 313/474, 476, 478, 482

(56) References Cited

U.S. PATENT DOCUMENTS 5,298,984 A * 3/1994 Numata
5,353,070 A * 10/1994 Mitani et al. ........... 313/474 X
5,412,437 A * 5/1995 Ogino et al. ................. 313/478
5,812,215 A * 9/1998 Yamada et al. ............. 348/825

* cited by examiner

Primary Examiner—W. B. Perkey
(74) Attorney, Agent, or Firm—Robert E. Bushnell, Esq.

(57) ABSTRACT

A CRT coupling apparatus of a projection television couples a CRT which forms a picture to a lens which magnifies the picture formed by the CRT and projects it onto a screen. The CRT coupling apparatus includes: a CRT bracket supporting the CRT; a lens bracket supporting the lens; a coupler placed between the CRT and the lens; and a spring wire fixing the CRT bracket and the lens bracket to the coupler by applying elastic force in mutually approaching directions. One side of the spring wire is connected to a side of the CRT bracket facing away from the coupler, and the other side of the spring wire is connected to a side of the lens bracket facing away from the coupler. The apparatus also includes an earth assembly installed in the CRT bracket and contacting a backplate of the CRT to draw static electricity generated in the CRT away from the CRT. Sealing elements are provided between the coupler and the CRT and lens, respectively.

20 Claims, 5 Drawing Sheets

CRT COUPLING APPARATUS OF PROJECTION TELEVISION

CLAIM OF PRIORITY

This application makes reference to, incorporates the same herein, and claims all benefits accruing under 35 U.S.C. §119 from my application CRT COUPLING APPARATUS OF PROJECTION TELEVISION filed with the Korean Industrial Property Office on Aug. 25, 2000 and there duly assigned Serial No. 49646/2000.

BACKGROUND OF THE INVENTION

1. Technical Field

The present invention relates to a cathode ray tube (CRT) coupling apparatus of a projection television and, more particularly, to a CRT coupling apparatus of a projection television for coupling a CRT and a lens to a coupler.

2. Related Art

Generally, a projection television is an apparatus which uses a reflecting mirror to reflect a picture magnified and projected from a CRT assembly, and projects the picture onto the backplate of a screen placed in the faceplate of the body of the television. The CRT assembly is installed in the body, and forms and projects a picture.

The CRT assembly includes a CRT for forming the picture, a coupler placed in the faceplate of the CRT, and a lens coupled to the coupler for magnifying the picture formed by the CRT and projecting it onto the screen.

The CRT is coupled to the coupler using a CRT bracket and a spring wire. The spring wire is coupled to an earth plate formed by a plate spring which contacts the backplate of the CRT. A plurality of spacers is formed on the coupler. Bolts are locked into the spacers through through-holes formed on the CRT bracket, thus coupling the CRT to the coupler. The spring wire presses elastically against the backplate of the CRT in the direction of the coupler due to the locking of the bolts into the spacers.

In addition, a lens bracket is coupled to the lens, and bolts which penetrate through through-holes formed on the lens bracket are locked to the spacers formed on the coupler. Sealing members are installed for sealing purposes once the CRT and the lens are coupled to the coupler.

The structure described above requires a plurality of bolts for coupling the CRT and the lens to the coupler. This means that a plurality of spacers have to be formed on the coupler. Thus, the manufacturing process is complicated, many components are required, and the manufacturing cost is high.

SUMMARY OF THE INVENTION

To solve the above problems, it is an object of the present invention to provide a CRT coupling apparatus of a projection television having an improved structure for coupling a CRT bracket and a lens bracket to a coupler with a spring wire, and using no bolts in the process.

Accordingly, to achieve the above object, there is provided a CRT coupling apparatus of a projection television for coupling a CRT which forms a picture and a lens which magnifies the picture formed by the CRT and which projects the picture onto a screen. The CRT coupling apparatus comprises: a coupler placed between the CRT and the lens; a CRT bracket supporting the CRT; a lens bracket supporting the lens; and a spring wire with one side connected to a side of the CRT bracket facing away from the coupler and the other side connected to a side of the lens bracket facing away from the coupler. The spring wire couples the CRT bracket and the lens bracket to the coupler by applying elastic force in mutually approaching directions.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
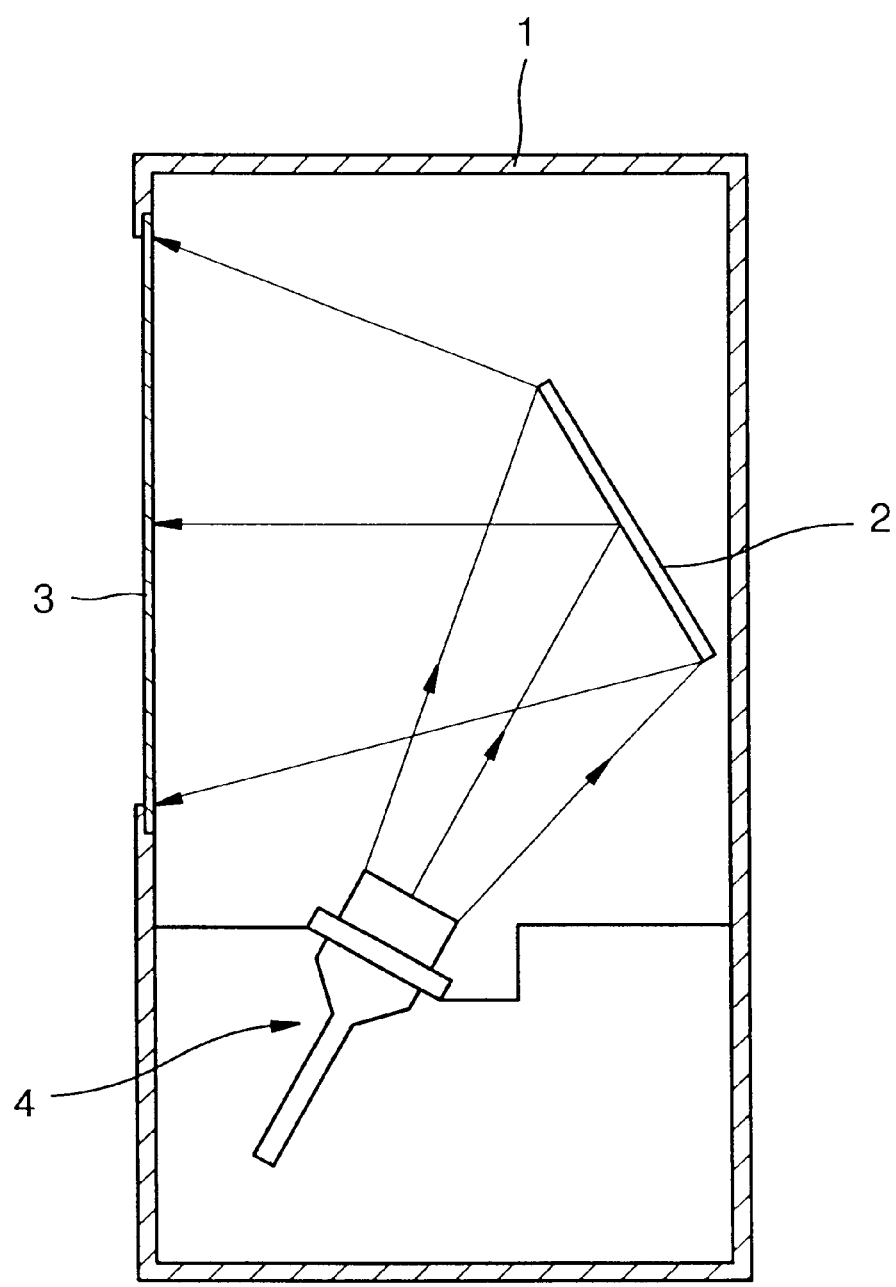
FIG. 1 is a sectional view of a projection television.

Generally, referring to FIG. 1, a projection television is an apparatus which has a body 1, a reflecting mirror 2, a screen 3, and a CRT assembly 4. A picture magnified and projected by CRT assembly 4 is reflected by reflecting mirror 2, and is projected onto the backplate of screen 3 placed in the faceplate of body 1. The CRT assembly 4 is installed in the body 1, and forms and projects the picture.

Figure 2:
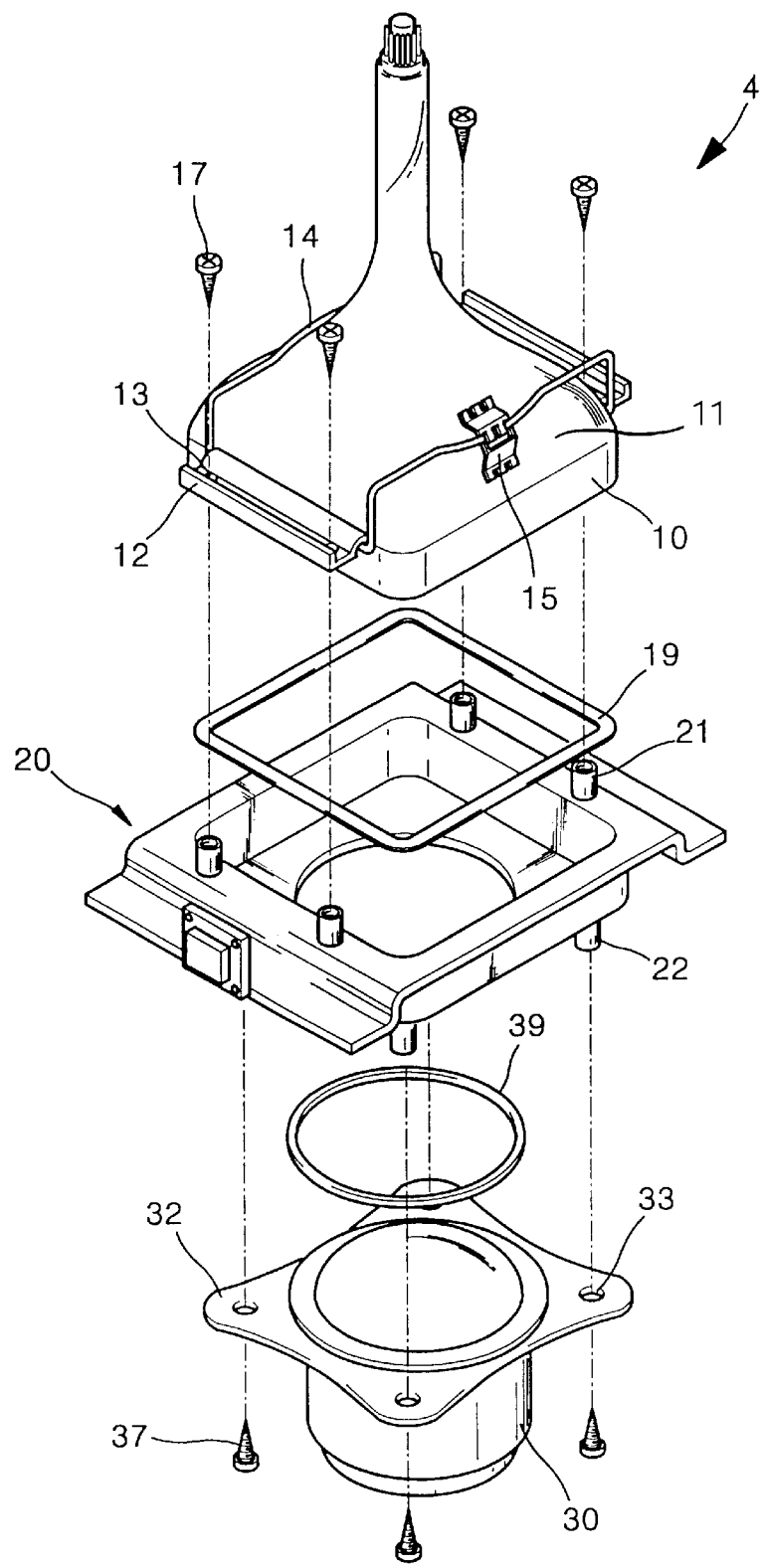
FIG. 2 is a partial perspective view illustrating a CRT coupling apparatus of a projection television.

As shown in FIG. 2, a CRT assembly 4 includes a CRT 10 for forming a picture, a coupler 20 placed in the faceplate of the CRT 10, and a lens 30 coupled to the coupler 20 for magnifying the picture formed by the CRT 10, and for projecting it onto the screen 3 (referring to FIG. 1).

The CRT 10 is coupled to the coupler 20 using a CRT bracket 12 and a spring wire 14. The spring wire 14 is coupled to an earth plate 15 formed by a plate spring which contacts the backplate 11 of the CRT 10. A plurality of spacers 21 is formed on the coupler 20. Bolts 17 are locked into the spacers 21 through through-holes 13 formed on the CRT bracket 12, thus coupling the CRT 10 to the coupler 20. The spring wire 14 presses elastically against the backplate 11 of the CRT 10 in the direction of the coupler 20 due to the locking action of bolts 17.

Also, a lens bracket 32 is coupled to the lens 30, and bolts 37 penetrate through through-holes 33 formed on the lens bracket 32, and are locked to spacers 22 formed on the coupler 20. Sealing members 19 and 39 are installed for sealing purposes once the CRT 10 and the lens 30 are coupled to the coupler 20.

The structure described above requires a plurality of bolts 17 and 37 to couple the CRT 10 and the lens 30 to the coupler 20. This means that a plurality of spacers 21 and 22 have to be formed on the coupler 20. Thus, the manufacturing process is complicated, many components are required, and the manufacturing cost is high.

Figure 3:
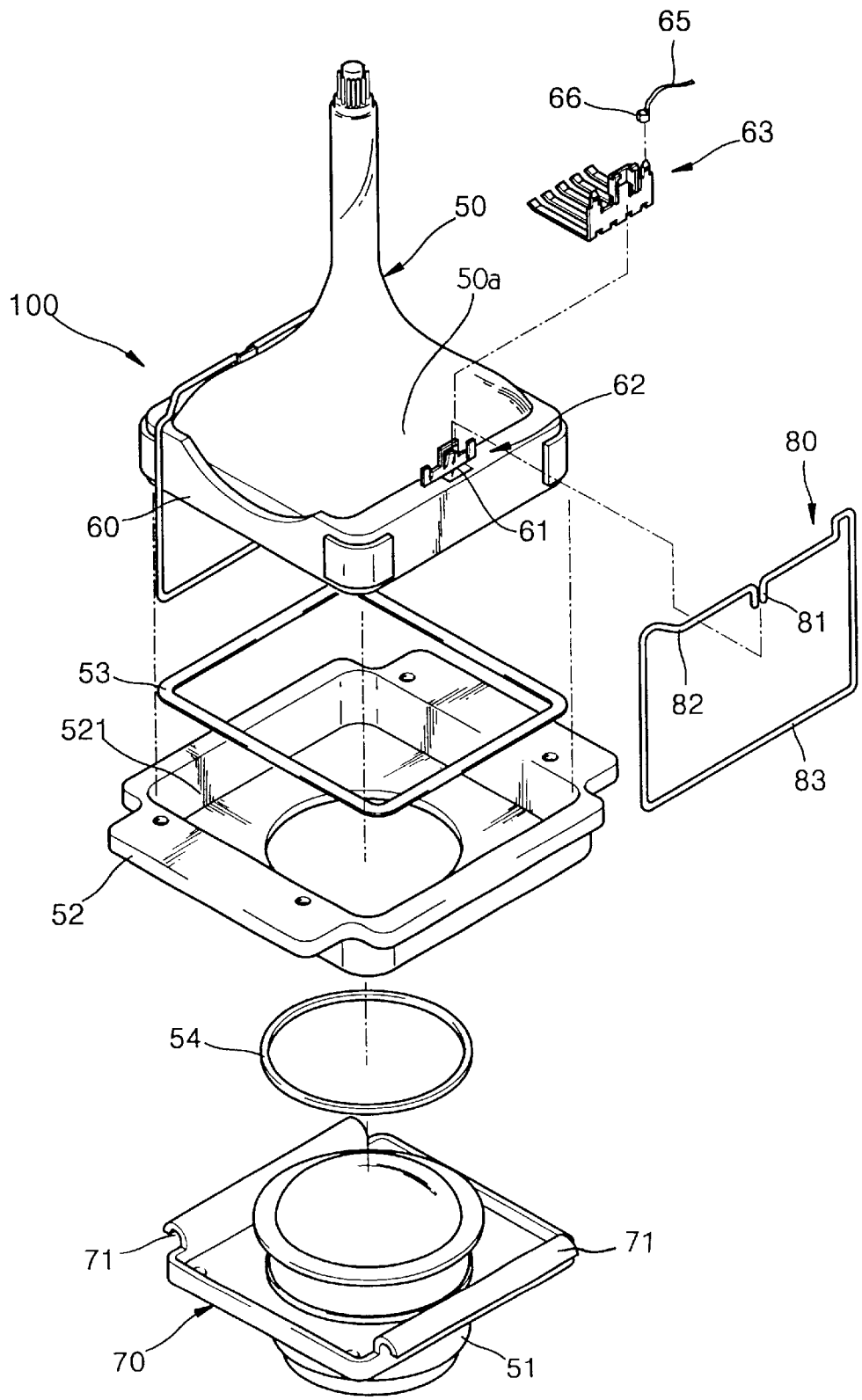
FIG. 3 is a partial perspective view illustrating a CRT coupling apparatus according to a preferred embodiment of the present invention.
Figure 4:
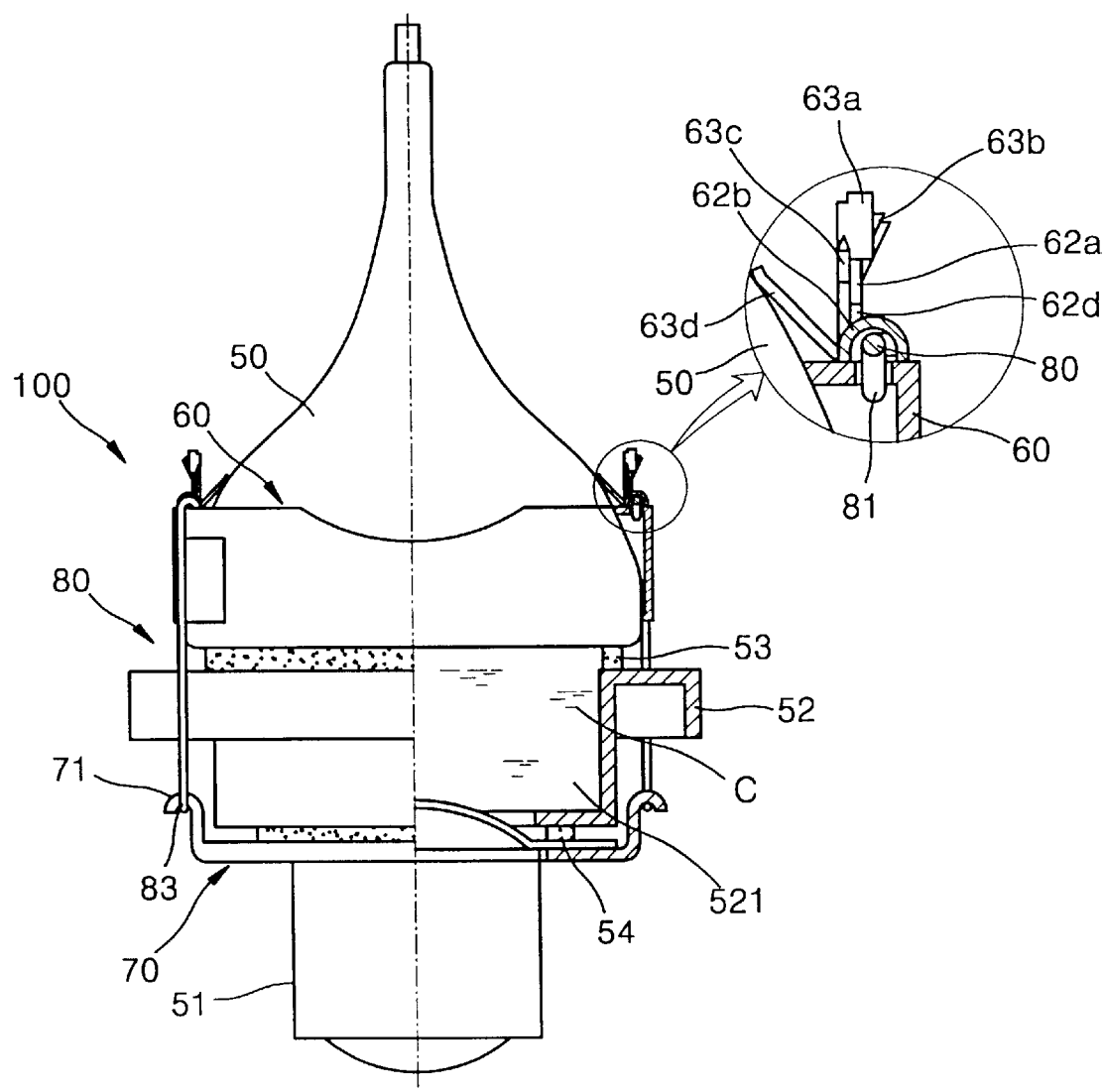
FIG. 4 is a sectional view of the CRT assembly shown in FIG. 3.
Figure 5:
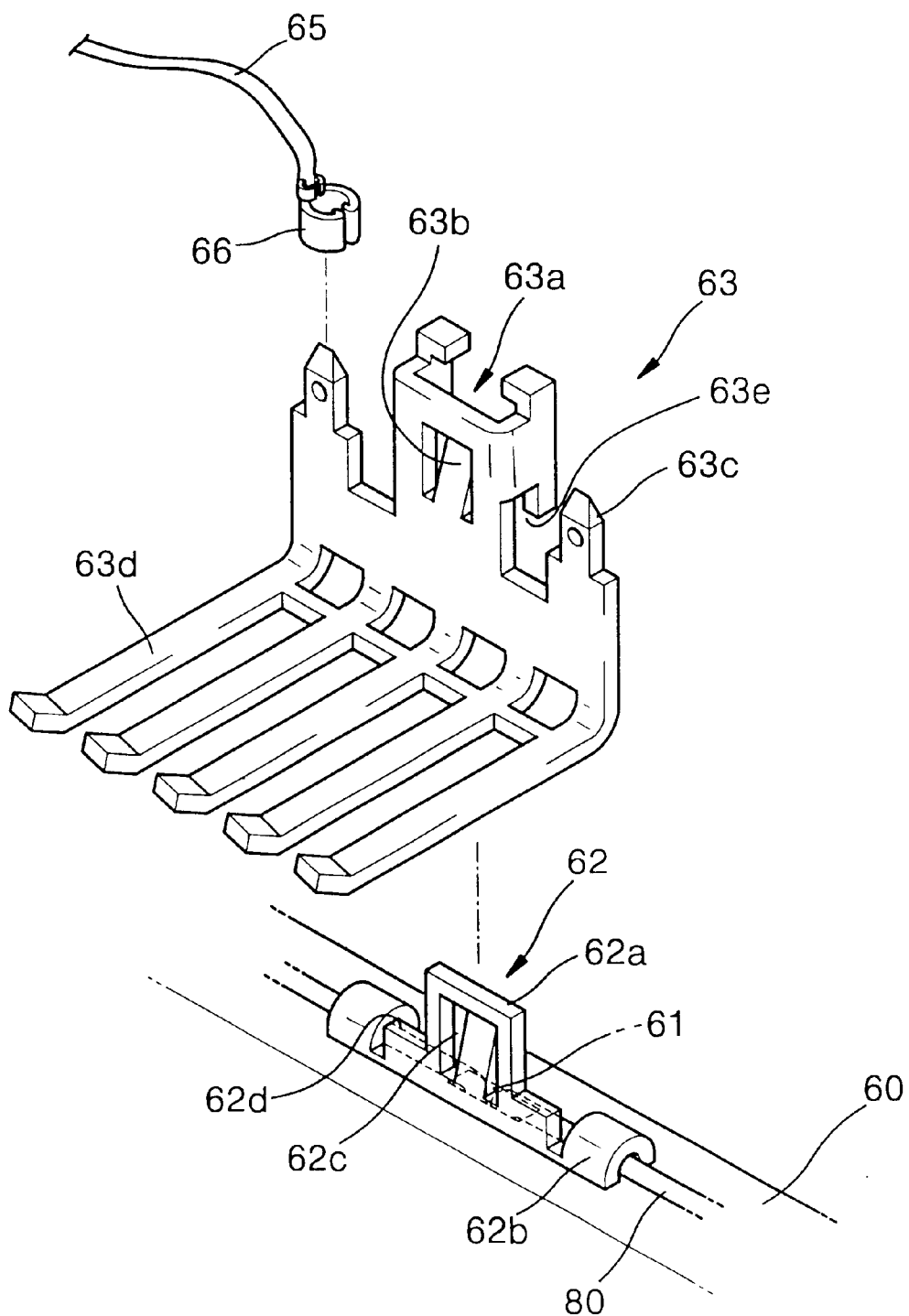
FIG. 5 is a partial perspective view illustrating an earth assembly part of the CRT assembly shown in FIG. 3.

FIG. 3 is a partial perspective view illustrating a CRT coupling apparatus of a projection television according to a preferred embodiment of the present invention, and FIG. 4 is a sectional view of the CRT assembly shown in FIG. 3. FIG. 5 is a partial perspective view magnifying and illustrating an earth assembly part.

Referring to the drawings, a CRT coupling apparatus of a projection television according to a preferred embodiment of the present invention includes: a coupler 52 placed between a CRT 50 and a lens 51; a CRT bracket 60 supporting the CRT 50; a lens bracket 70 supporting the lens 51; and a spring wire 80 in the shape of a loop for securing the CRT bracket 60 and the lens bracket 70.

The CRT 50 forms a picture, and the lens 51 magnifies the picture formed by the CRT 50 and projects it onto a screen 3 (FIG. 1).

The coupler 52 is manufactured by press processing a thick aluminum or steel sheet, and includes a coolant container 521 which can hold coolant (C) in a sealed space which is formed by coupling the CRT 50 and the lens 51.

The CRT bracket 60 is placed on the backplate of the CRT 50 for coupling the CRT 50 to the coupler 52, and bracket 60 wraps and supports the CRT 50. The CRT bracket 60 is manufactured by press processing a thick metal sheet. On both sides of the CRT bracket 60, bridging grooves 61 are formed so that both ends 81 of a spring wire 80, which will be described later, can be inserted thereinto. An earth assembly is installed and is connected to a terminal 66 of an earth wire 65 in order to draw static electricity, generated in the CRT 50, away from CRT assembly 100. The earth assembly includes a supporting part 62 integrally formed with the CRT bracket 60, and a ground contact part 63 which slides into, and couples to, the supporting part 62. The supporting part 62 includes a center section 62a having a groove 62c, a step portion 62d and an arch part 62b. The arch part 62b is spread like the center section 62a before the spring wire 80 is coupled; however, after both ends 81 of the spring wire 80 are coupled to the bridging groove 61, the arch part 62b is bent in the shape of an arch, as shown in FIG. 5, to prevent the spring wire 80 from slipping out. Also, the ground contact part 63 includes a sliding groove 63a into which the center section 62a is slid so as to be coupled thereto, a bridging groove 63e into which the step portion 62a is inserted and coupled, an elastic spacer 63b coupled elastically to the groove 62c, a terminal coupling part 63c to which the terminal 66 is coupled, and a contact arm 63d which contacts the backplate 50a of the CRT 50. Thus, when the center section 62a is coupled to the sliding groove 63a, the elastic spacer 63b is elastically coupled to the groove 62c, and the contact arm 63d contacts the backplate 50a of the CRT 50. Accordingly, an earth line which passes through the contact arm 63d, the terminal coupling part 63c, the terminal 66 and the earth wire 65 is formed.

The lens bracket 70 is formed to keep the lens 51 secured to the coupler 52, while supporting the lens 51. In forming lens bracket 70, a thick metal sheet is press-processed, and a bridging sill 71 is formed to hook the spring wire 80 to both ends of the lens bracket 70.

The spring wire 80 includes a tension part 82 which is bent to apply pressure elastically to the CRT bracket 60, and a coupling part 83 is inserted into the bridging sill 71 of the lens bracket 70. The ends 81 are fixed together, and are inserted together into the bridging groove 61 of the CRT bracket 60. The bent tension part 82 is spread by elastic deformation when the spring wire 80 is coupled to the CRT bracket 60 and the lens bracket 70. Then, after completing the coupling, the backplate of the CRT bracket 60 is pressed toward the coupler 52 by the restoring force of the bent tension part 82. Preferably, the spring wire 80 is produced from a high elastic piano wire.

A sealing member 53 is placed between the CRT 50 and the coupler 52, and a sealing member 54 is placed between the lens 51 and the coupler 52. These sealing members 53 and 54 prevent leakage of the coolant (C) in the coolant container 521 of the coupler 52.

The steps of assembling the CRT assembly of a projection television according to a preferred embodiment of the present invention will now be described.

As shown in FIG. 3, the sealing member 53 and the CRT 50 are placed on the coupler 52, with the CRT bracket 60 being installed on the backplate of the CRT 50. The sealing member 54, the lens 51, and the lens bracket 70 are installed under the coupler 52. Then, after inserting both ends of the spring wire 80 into the bridging grooves 61 of the CRT bracket 60, a force is applied to the coupling part 83 by the spring wire 80 in the direction of the lens 51, using a jig (not shown), so that the spring wire 80 becomes lodged in the bridging sill 71 of the lens bracket 70.

When a force is applied to the spring wire 80 by the jig, the tension part 82 is elastically deformed, and the space between the tension part 82 and the coupling part 83 is extended to a predetermined distance. Thus, the coupling part 83 of the spring wire 80 is inserted into the bridging sill 71 of the lens bracket 70, and the sealing members 53 and 54 formed of rubber materials are elastically deformed due to the force of the spring wire 80 in restraining the CRT 50 and the lens 51 from separating from the coupler 52.

Once the jig is removed, the CRT bracket 60 and the lens bracket 70 are each pressed toward the coupler 52 by the restoring force of the spring wire 80. Also, a restoring force generated by the sealing members 53 and 54 tends to push the CRT 50 and the lens 51 away from the coupler 52, so that movement of the CRT bracket 60 and the lens bracket 70 against the coupler 52 is restrained. Moreover, the sealing members 53 and 54 tightly seal the interfaces between the coupler 52, the CRT 50 and the lens 51 so that the coolant (C) in the coolant container 521 does not leak.

Also, static electricity generated by the CRT 50 is drawn away from the CRT assembly 100 and toward the outside by the earth assembly (supporting part 62 and ground contact part 63) installed in the CRT bracket 60.

Thus, since the CRT bracket 60 and the lens bracket 70 are fixed to the coupler 52 by the elastic restoring force of the spring wire 80, it is not necessary to use an additional fastening member like a bolt, so that the number of components and the number of operation processes can be reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A cathode ray tube (CRT) coupling apparatus of a projection television having a CRT for forming a picture coupled to a lens for magnifying the picture formed by the CRT and for projecting the picture onto a screen, said CRT coupling apparatus comprising:

a CRT bracket supporting the CRT;

a lens bracket supporting the lens;

a coupler placed between the CRT and the lens; and a spring wire fixing the CRT bracket and the lens bracket to the coupler by applying elastic force in mutually approaching directions, wherein a first side of the spring wire is connected to a side of the CRT bracket facing away from the coupler, and a second side of the spring wire is connected to a side of the lens bracket facing away from the coupler.

2. The apparatus of claim 1, wherein bridging grooves are formed on the side of the CRT bracket facing away from the coupler, a bridging sill is formed on the lens bracket, the spring wire is formed into the shape of a loop having two ends fixed together, and the spring wire is coupled to the CRT bracket and to the lens bracket by inserting the two ends of the spring wire into the bridging grooves and connecting the other side of the spring wire to the bridging sill.

3. The apparatus of claim 2, wherein the spring wire has a bent tension part which is elastically deformed when the CRT bracket and the lens bracket are coupled to the coupler, and is partially elastically restored after the coupling is completed.

4. The apparatus of claim 1, wherein the spring wire has a bent tension part which is elastically deformed when the CRT bracket and the lens bracket are coupled to the coupler, and is partially elastically restored after the coupling is completed.

5. The apparatus of claim 1, further comprising an earth assembly installed in the CRT bracket and contacting a backplate of the CRT to draw static electricity generated by the CRT away from the CRT and toward the outside.

6. The apparatus of claim 1, further comprising first sealing means disposed between the CRT and the coupler for sealing a space between the CRT and the coupler, and second sealing means disposed between the lens bracket and the coupler for sealing a space between the lens bracket and the coupler.

7. The apparatus of claim 1, further comprising an earth assembly which includes a supporting part integrally formed with the CRT bracket, and a ground contact part which engages the supporting part.

8. The apparatus of claim 7, wherein said supporting part comprises a center section having a groove formed therein, a step portion on each side of the center section, and an arch part on a side of each said step portion remote from said center section.

9. The apparatus of claim 8, wherein said arch part is spread to receive the spring wire before the spring wire fixes the CRT bracket and the lens bracket to the coupler, and wherein said arch part returns to an arch-like shape once the spring wire is received by said arch part, thereby preventing the spring wire from slipping out.

10. The apparatus of claim 7, wherein said ground contact part comprises a sliding groove for receiving a center section of said support part, a bridging groove for receiving a step portion of said support part, an elastic spacer coupled elastically to a groove of said center section of said supporting part, a terminal coupling part to which a ground terminal is coupled, and a contact arm for contacting a backplate of the CRT.

11. A cathode ray tube (CRT) coupling apparatus of a projection television, which includes a CRT for forming a picture and a lens coupled to said CRT for magnifying the picture formed by the CRT and for projecting the picture onto a screen, the CRT coupling apparatus comprising:

a CRT bracket supporting the CRT;

a lens bracket supporting the lens;

coupler means disposed between the CRT and the lens for coupling the CRT and the lens; and spring means for fixing said CRT bracket and said lens bracket to said coupler means by applying elastic force in mutually approaching directions, wherein a first side of said spring means is connected to a side of said CRT bracket facing away from said coupler means, and a second side of said spring means is connected to a side of said lens bracket facing away from said coupler means.

12. The apparatus of claim 11, wherein said CRT bracket has bridging grooves formed on a side thereof facing away from said coupler means, said lens bracket has a bridging sill formed therein, and said spring wire means is coupled by inserting ends of said spring wire means into the bridging grooves and connecting another portion of said spring wire means to the bridging sill.

13. The apparatus of claim 12, wherein said spring wire means has a bent tension part which is elastically deformed when said CRT bracket and said lens bracket are coupled to said coupler means, and is partially elastically restored after the coupling is completed.

14. The apparatus of claim 11, wherein said spring wire means has a bent tension part which is elastically deformed when said CRT bracket and said lens bracket are coupled to said coupler means, and is partially elastically restored after the coupling is completed.

15. The apparatus of claim 11, further comprising an earth assembly installed in the CRT bracket and contacting a backplate of the CRT to draw static electricity generated from the CRT away from the CRT.

16. The apparatus of claim 11, further comprising first sealing means disposed between the CRT and the coupler means for sealing a space between the CRT and the coupler means, and second sealing means disposed between the lens bracket and the coupler means for sealing a space between the lens bracket and the coupler means.

17. The apparatus of claim 11, further comprising an earth assembly which includes a supporting part integrally formed with the CRT bracket, and a ground contact part which engages the supporting part.

18. The apparatus of claim 17, wherein said supporting part comprises a center section having a groove formed therein, a step portion on each side of the center section, and an arch part on a side of each said step portion remote from said center section.

19. The apparatus of claim 18, wherein said arch part is spread to receive the spring wire means before the spring wire means fixes the CRT bracket and the lens bracket to the coupler means, and wherein said arch part returns to an arch-like shape once the spring wire means is received by said arch part, thereby preventing the spring wire means from slipping out.

20. The apparatus of claim 17, wherein said ground contact part comprises a sliding groove for receiving a center section of said support part, a bridging groove for receiving a step portion of said support part, an elastic spacer coupled elastically to a groove of said center section of said supporting part, a terminal coupling part to which a ground terminal is coupled, and a contact arm for contacting a backplate of the CRT.

* * * * *